June 23, 1970     L. GLATT ET AL     3,517,334
LASER PUMPED BY MULTIPLE PHOTON ABSORPTION
Original Filed July 2, 1964
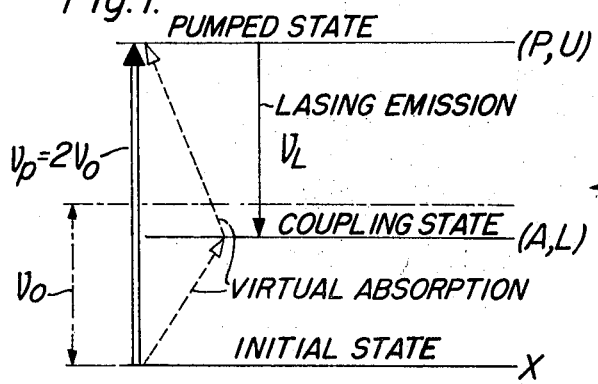
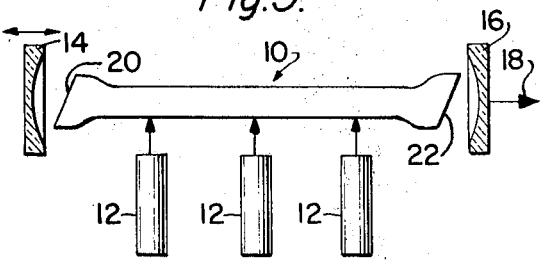
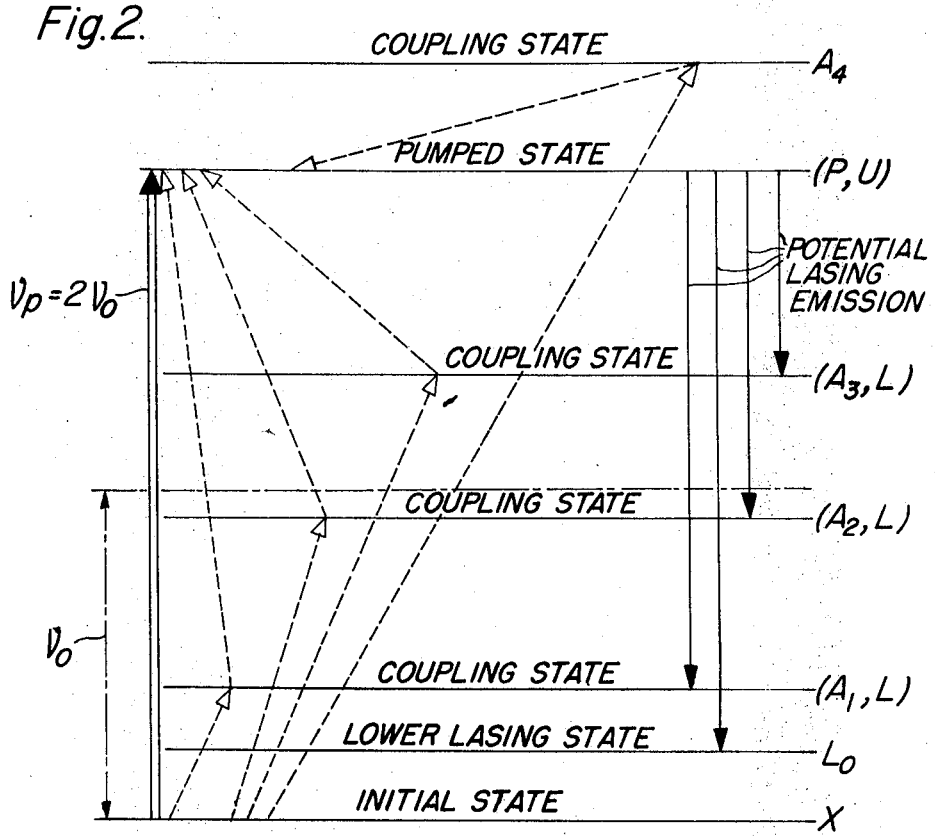
INVENTORS:
SAUL ALTSHULER,
LEONARD GLATT,
BY
AGENT.

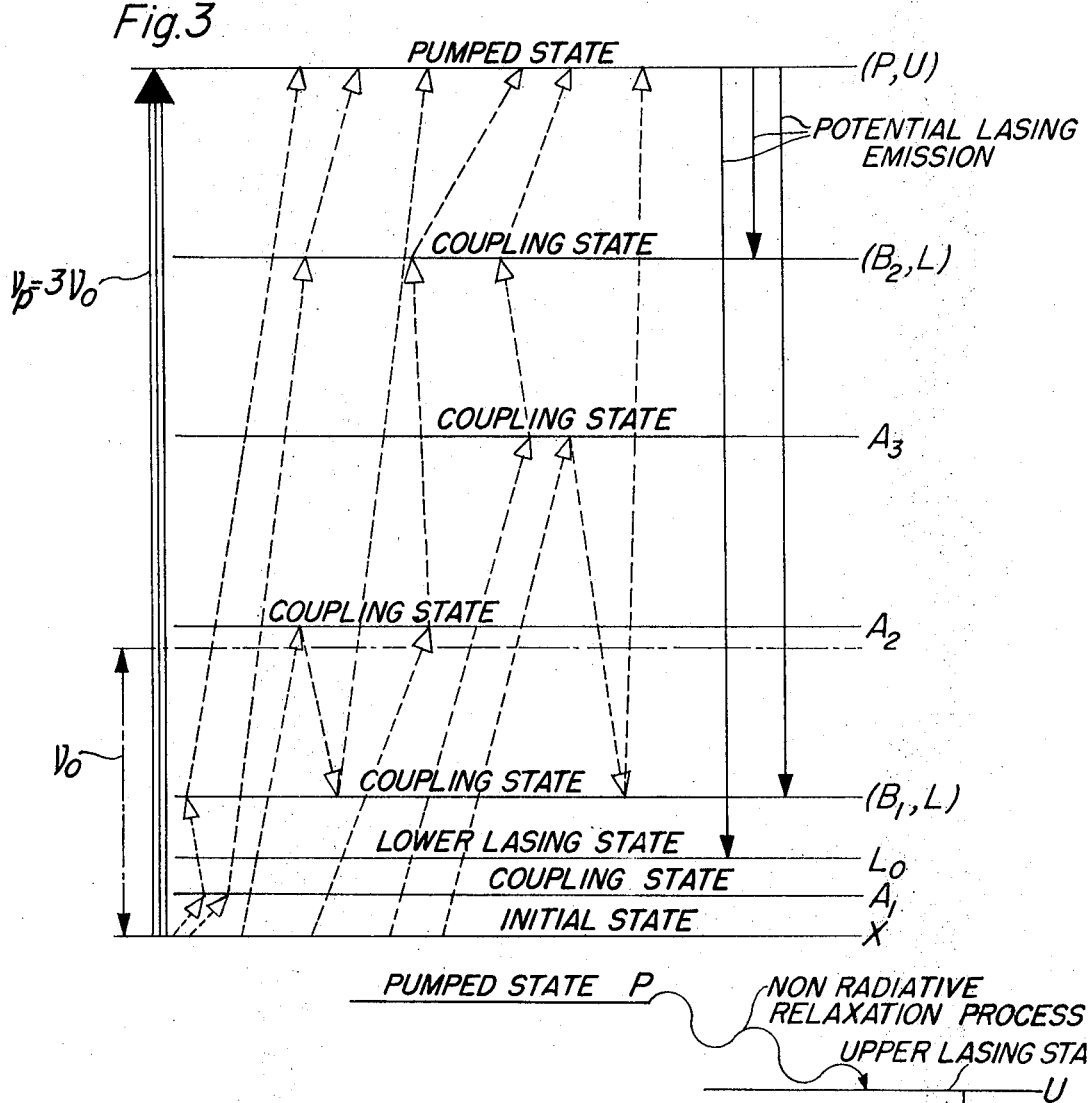
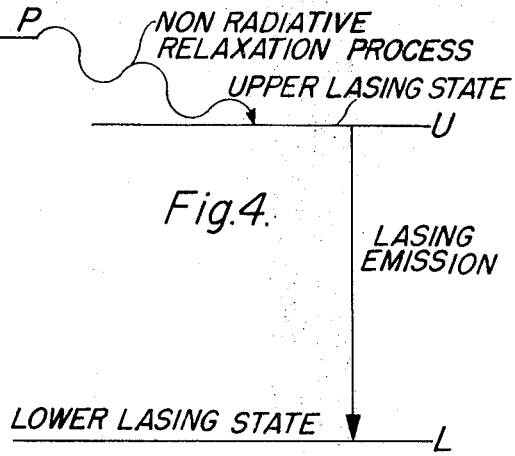
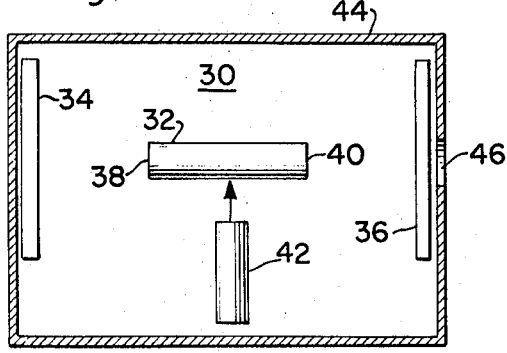

United States Patent Office 3,517,334
Patented June 23, 1970

3,517,334
LASER PUMPED BY MULTIPLE PHOTON ABSORPTION
Leonard Glatt, Torrance, and Saul Altshuler, Manhattan Beach, Calif., assignors to TRW Inc., a corporation of Ohio
Continuation of application Ser. No. 379,840, July 2, 1964. This application Dec. 16, 1968, Ser. No. 785,441
Int. Cl. H01s 3/22
U.S. Cl. 331—94.5                9 Claims

ABSTRACT OF THE DISCLOSURE

A laser which includes active atoms which may be pumped to an excited state by multiple such as double or triple photon absorption. Since the atoms may be pumped to a high energy level, new laser frequencies are available which may be higher than the pumping frequency. In other words, the output energy may be larger than the input energy, but of course of smaller intensity. The atoms may be in gaseous or crystalline form and the pumping source may be another laser. The frequency of the pumping radiation preferably is a submultiple of the frequency separation between an initial state and the pumped state of the active atoms.

---

This application is a continuation of application, Ser. No. 379,840 filed July 2, 1964 and now abandoned.

This invention relates to improvements in lasers, and more particularly to a laser capable of generating optical signals of higher frequency than the pumping signal.

Like more conventional laser devices, this invention is designed to deliver an intense coherent beam of collimated monochromatic radiation. The output light beam can be utilized, for example, for the transmission of power, as a carrier to be modulated for the transmission of messages, as well as other known purposes.

Detectable laser output beams have been produced to date for only a few substances. Most of these substances can emit only a single strong laser output frequency. The new pumping technique of population inversion by multiple photon absorption to be described makes available an appreciable number of additional laser output frequencies which cannot be obtained by the conventional optical pumping procedure. Furthermore, some types of substances in which population inversion may be achieved by the new technique are capable of producing laser output beams at several discrete frequencies. A variable cavity laser device of this type can therefore be tuned from one to another of these fixed optical frequencies.

Probably the most important advantage is the capability of developing higher frequency laser output beams, which thus would consist of higher energy photons. The output beams of conventionally pumped lasers consist of photons whose frequency is never greater, and usually appreciably less than the "pumping" optical frequency interval utilized to achieve the desired population inversion. The new technique of pumping by multiple photon absorption, however, has the capacity for obtaining output beam frequencies that are several times the pumping frequency.

The invention contemplates the use of a novel means for inducing lasing action to occur in various selected substances which have suitable distributions of quantized energy levels. These spectrally active substances are in the form of an ensemble of semi-elementary particles, such as atoms, molecules or ions, preferably but not necessarily in either a gaseous state or in the lattices of crystals which are transparent to the pumping frequency. For liquids and glasses, either a natural relaxation process or some artifice would be required to channel the desired population inversion of the selected excited state into a preselected very narrow spectral region of the natural broad excited "band" of energy levels. The same is also true for some types of crystalline substances. The device of the invention is novel primarily in that the required energy lovel population inversion is produced not by the usual single photon absorption process but by multiple photon absorption induced by an extremely intense radiation field.

In accordance with the invention, there is provided a body of laser material which includes an ensemble of spectrally active particles capable of stimulated emission of radiation by multiple absorption of photon energy having a pumping frequency which is the corresponding submultiple of the frequency separation between initial and pumped quantum states of one species of said ensemble. The one species of particles has at least one group of coupling quantum states of different energy levels preferably, but not necessarily, all lying between those of the initial and pumped states. The coupling quantum states are to be considered as arranged with the initial and pumped states in an ordered array of quantum states, beginning with the initial state and ending with the pumped state. Again it is preferable, but not completely necessary, that the individual energy levels of the various states increase in the order of the array. Each quantum state in the array has permitted single photon radiative electric dipole transitions with each of its nearest adjacent quantum state in the array. The number of coupling states in the array is one less than the multiplicity of photons absorbed by an individual particle of the ensemble undergoing a transition from the initial state to the pumped state.

Means are also provided for pumping the particle ensemble with a very intense photon flux having a frequency equal to a submultiple of the frequency separation between the initial and pumped states of the one species referred to above. Through the mechanism of multiple photon absorption, the particles of the one species are raised from the initial state to the pumped state to cause population inversion between a pair of upper and lower quantum states of a species of said ensemble. The latter species may be the same as or different from the one species. The upper state may be the same as the pumped state or it may be a different state. The lower state may be one of the coupling states or it may be a different state. In any event, when the particle ensemble is placed in an optical cavity tuned to the frequency separation of the upper and lower quantum states, radiative transitions occur between the upper and lower quantum states to cause laser emission of a frequency corresponding to the energy level separation of those states.

According to one feature of the invention, when the ensemble of particles are such that the lower quantum state is close in energy level to the initial quantum state, the laser emission frequency is almost twice that of the pumping frequency when the population inversion is produced by double photon absorption, and is almost three times the pumping frequency for triple photon absorption, and so on. By double photon absorption is meant that the absorption of two photons by a single irradiated or pumped particle will excite the particle through an energy level difference having a frequency separation equal to twice that of the exciting photons. Similarly, triple photon absorption produces excitation through a frequency separation that is three times the frequency of the exciting photons, and so on.

In the drawing:

FIGS. 1-4 are energy diagrams useful in explaining the operation of laser systems employing optical pumping by multiple photon absorption;

FIG. 5 is a schematic diagram of a multiple photon pumped gaseous laser system; and FIG. 6 is a schematic diagram of a multiple photon pumped solid state laser system.

In any embodiment of this invention there is provided an optical radiation source capable of generating an extremely intense photon field at an optical pumping frequency $\nu_0$ and a "lasing" substance containing a selected spectrally active species of constituent particles that possess at least a minimum suitable distribution of excited quantum states to be designated as the "initial state," the "pumped state," and the group of "virtual transition coupling states." The constraints that these various excited states must satisfy will be described in the following paragraphs.

Double photon absorption pumping demands the existence of at least one coupling state; triple photon absorption pumping demands at least two coupling states. In general, at least one set of $(n-1)$ different coupling states are required for $n$-fold photon absorption pumping with $n$ representing a positive integer. As an aid to visualization, the process of $n$-fold photon absorption can be conceived of as a series of $n$ "virtual transitions": from the ground state to the nearest coupling state, then to a second coupling state, and so on to the end at the pumped state after $n$ virtual transitions, each of which satisfy the quantum mechanical selection rules for single photon radiative electric dipole transitions.

Real species of spectrally active particles which possess a minimum array of quantum states, of suitable excitation energies and "symmetries" to satisfy the required constraints to act as "virtual transition coupling levels" for multi-photon absorption, generally will possess distributed sets of quantum states eligible to perform each such coupling function. The symmetry of a given quantum state is determined by its set of quantum numbers, exclusive of the principal quantum number which characterize the state. A set of potential coupling states of the same symmetry and of different energy levels (that is, of different principal quantum number) may be designated individually as states, $A_1$, $A_2$, $A_3$, and collectively as set $\{A_i\}$. Similarly, other sets of potential coupling states may be designated as sets $\{B_i\}$, $\{C_i\}$, etc. Not all of the potential coupling states in sets $A_i$ $B_i$ $C_i$ (with $i$ running through 1, 2, 3) need be discrete, or "fine line" states. Some, or possibly all, of these states may correspond to finite width energy bands in solids, or perhaps correspond to energy continua which are characteristic of ionization or dissociation phenomena in gases.

The necessary conditions for a distribution of quantum states to be suitable for $n$-fold photon absorption pumping is now described. First, let the excitation energy of the pumped state P, relative to the zero-excitation ground state X, be designated by $\epsilon_p$, and the corresponding photon frequency $\nu_p$. The first necessary condition is that for $n$-fold absorption pumping ($n$ is a dummy symbol representing 2 or 3 or 4, or . . .), $\nu_p$ must equal $n\nu_{p0}$ (i.e., $n$ times the photon frequency $\nu_0$ of the pumping radiation field). Then, according to Bohr's energy relation, $\epsilon_p = h n \nu_0$, where $h$ is Planck's constant.

Now consider any eligible complete chain of participating quantum states, preferably arrayed in the order of increasing excitation energy and exhibited as [X, $A_i$ $B_j$, $C_k$ . . . P]. Here $A_i$, $B_j$, $C_k$, and so forth, may be arbitrary members of the respective symmetry classes of coupling quantum states $\{A_i\}$, $\{B_i\}$, $\{C_i\}$, and so on. The second necessary condition demands that the symmetries of the various participating quantum states (or sets of quantum states) be such that single photon radiative electric dipole transitions would be permitted between each state in the ordered array and each of its closest neighbor states on either side. That is, such single photon transition should be permitted between X and $A_i$, between $A_i$ and $B_j$ between $B_j$ and $C_k$, and so forth, and finally between the pumped state P and its nearest neighbor in the selected array.

In double photon absorption pumping, for example, the participating arrays of states reduce to the form [X, $A_i$, P], and the second necessary condition introduced in the preceding discussion reduces to the requirement that single photon electric dipole transitions must be permitted between any eligible coupling state $A_i$ and both the ground state X and the pumped state P. Participating state arrays for triple photon absorption pumping reduce to the form [X, $A_i$, $B_j$, P], with single photon radiative electric dipole transitions required to be permitted between X and $A_i$, between $A_i$ and $B_j$, and between $B_j$ and P. Here again, the specific coupling states $A_i$ and $B_j$ may be arbitrary members of separate co-symmetry classes of states $\{A_i\}$ and $\{B_i\}$. Similarly, for quadruple photon absorption pumping, participating state arrays reduce to the form [X, $A_i$, $B_j$, $C_k$, P], with single photon radiative electric dipole transitions required to be permitted between X and $A_i$, between $A_i$ and $B_j$, between $B_j$ and $C_k$ and between $C_k$ and P. The extension to higher multiplicity photon absorption pumping now should be evident without further illustration.

The symmetry constraints, or "selection rules" under which electric dipole radiative transitions between pairs of quantum states are either "permitted" or "forbidden" must be determined separately for each species of spectrally active particle but, in general the character of the constraints tends to alter as the spectrally active particles become larger and more massive. All of the constraints are quite strict for the lighter species of atoms in a gaseous state, but some of the constraints are relaxed, or change their character, for heavier gaseous atoms. Various revised sets of constraints hold for gaseous state molecules, since here a multitude of internal vibration and rotation excitation modes interact with electronic excitations to proliferate the total number of available quantum states. The character of the spectroscopic selection rules become still further changed, and sometimes their strength diluted to near the vanishing point, for various types of condensed state substances. In some types of crystalline substances the constraints are so weak that practically any energy states, either discrete or in continuous "bands," lying between the ground state X and the pumped P (or possibly even states of higher energy than that of P) would serve as potential coupling states. The spectra of rare earth atoms or ions imbedded in a crystalline matrix, on the other hand, obey stricter selection rules and highly resemble that of gaseous state atoms. Here, however, there generally are so many different states lying between the ground state X and a selected high energy state P that there are virtually certain to be some intermediate states which are eligible to act as the desired coupling states $A_i$, $B_j$, and so on. A condensed state substance to be potentially susceptible to multiple photon absorption pumping would depend primarily upon the first necessary condition, mentioned in the preceding discussion, that an excited state P exist for which $\nu_p = n\nu_0$. For gaseous state species, on the other hand, it is just as necessary to predetermine the existence of at least one array of coupling states of suitable symmetry to satisfy the selection rules.

There is an important corollary condition arising from the strict selection rules for gaseous species, and particularly for gaseous atoms. This corollary condition states that if single photon radiative electric dipole transitions are permitted, as is required between all nearest neighbor states in an array [X, $A_i$, $B_j$, $C_k$ . . . P], then such transitions will be forbidden between all next nearest neighbor states in the array. More generally, if the states are assigned positive integer order numbers ranging from 1 to $n+1$ and corresponding to the position of the state in the ordered array, then single photon radiative electric dipole transitions will be forbidden between any pair of states in the array if they both have an odd order number, or if they both have an even order number. As a simple example, transitions would be forbidden between X and P for even-photon absorption pumping. That is, a state which would be pumped by double photon absorption could not be pumped by conventional single photon absorption processes. As a further example, in an array of six states [X, $A_i$, $B_j$, $C_k$, $D_l$, P] corresponding to five photon absorption pumping, single photon electric dipole transitions must be permitted between X and $A_i$, between $A_i$ and $B_j$, between $B_j$ and $C_k$, and between $D_l$ and P; but if the spectrally active species is a gaseous state atom, then transitions will be forbidden between any pair of states both selected either from the odd ordered sub-set (X, $B_j$, $D_l$) or from the even ordered set-set ($A_i$, $C_k$, P). Also, transitions are forbidden between any pair of states both belonging to the same co-symmetry class $\{A_i\}$, or $\{B_i\}$, and so forth. In many embodiments of this invention two or more of the even ordered states, such as ($A_i$, $C_k$, P) in the preceding example may well belong to the same co-symmetry class. That is the pumped state P may exibit the same symmetry as the coupling state $A_i$ or $C_k$, or all three of these states may share identical symmetry. A similar statement is true for the odd ordered states, such as (X, $B_j$, $D_l$) in the preceding example. As was mentioned previously these selection rules are severely diluted in condensed state systems.

Some simple illustrative examples are given in the diagrams to be described below. In order to simplify the presentation these figures depart from conventional spectroscopic energy level and transition diagrams. According to the usual conventions, quantum states belonging to the same symmetry class are represented by short horizontal lines lying in the same vertical column, with single photon radiative dipole transitions being permitted only between states lying in nearest neighbor columns. This type of conventional representation, however, would require a proliferation of diagrams to account for the possible distributions of the initial, coupling, and pumped states into the various permissible symmetry classes, and hence into various vertical columns. In this presentation, however, it is unnecessary to exhibit all the various symmetry classes of any particular spectrally active species in a conventional energy level diagram. Only those types of states are shown that would participate in a multiple photon absorption process and in the consequent lasing emission process, and it is presupposed that these states belong to types of symmetry classes which would permit the indicated virtual and real transitions to occur. Each quantized state therefore will be represented by a long horizontal line, with increasing excitation energises above the ground state being represented by correspondingly increasing vertical displacements. Permitted virtual single photon transitions between two states will be represented by dashed diagonal lines between the horizontal lines representing these states. Zigzag lines will indicate non-radiative relaxation transitions, while vertical solid single lines will indicate lasing emissions. Multiple photon absorption will be indicated by close bundles of parallel vertical lines of the corresponding multiplicity. Arrowheads will be pointed upward to indicate absorption, and downward to indicate emission.

Referring to FIG. 1, the simplest conceivable system of this invention is a double photon absorption pumped lasing system in which there is only three participating quantum states, namely: the ground state X; a single coupling state A, which also functions as the lower state L for lasing emission; and the pumped state P, which also functions as the upper state U whose population is inverted relative to $L=A$. When pumping radiation of a certain threshold intensity and of a pumping frequency $\nu_0$ equal to ½ the frequency separation between initial or ground state X and pumped state P excites the system, the spectrally active particles are raised from the ground state X to the pumped state P through double photon absorption, as indicated by the double line arrow. Single photon virtual absorption processes may be considered as occurring from ground state X to coupling state A, and then from coupling state A to the pumped state P, as indicated by the dashed line arrows. Where conditions are such that a population inversion occurs between states P and A single photon lasing emission can be inducted between these states at a lasing frequency $\nu_L$ corresponding to the energy level separation therebetween, as indicated by the single line arrow drawn between levels (P, U) and (A, L). The notations P and U at the same levels, or (P, U), indicate that in this example the upper lasing state U coincides with the pumped state P. Similarly notations (A, L) indicate that in this example the coupling state A coincides with the lower lasing state or terminal level L.

In order to achieve efficient double photon absorption pumping the excitation energy of at least one of the $A_i$ coupling states should be somewhere close to $\frac{1}{2}\epsilon_p$ (i.e., close to half the excitation energy of the P state). However, when only one A-type coupling state exists, and this also does double duty as the lower lasing state L, then the subsequent laser emission frequency probably would be only slightly higher, or slightly lower, than the spectral frequency $\nu_0$ of the pumping radiation field.

In preferred double photon absorption systems for which the pumped state P serves as the upper lasing state U, there will be several A-type coupling states, $A_1$, $A_2$, $A_3$ . . . , as shown in FIG. 2, with one of these, for example state $A_2$, having an excitation energy fairly close to (but not equal to) $\frac{1}{2}\epsilon_p$. The L state then could be a different low lying state such as, for example, $A_1$ or perhaps could belong to a different symmetry class than that of $\{A_i\}$, such as $L_0$. The lasing frequency $\nu_L$ is thus substantially greater than the pumping frequency $\nu_0$ and nearly twice the pumping frequency $\nu_0$. The various dashed line arrows in FIG. 2 show the different chains of virtual transitions that are possible between the ground state X and coupling states $A_1$ through $A_4$ and between the coupling states $A_1$ through $A_4$ to the pumped state P. The downward directed solid single lines indicated various possible lasing emission transitions.

An example of a system which employs triple photon absorption pumping is shown in FIG. 3. For simplicity only five coupling states $A_1$, $A_2$, $A_3$ and $B_1$, $B_2$ are shown. However, it is understood that larger sets of coupling states $\{A_i\}$ and $\{B_i\}$ may exist. Triple photon absorption occurs between the ground state X and pumped state P, as indicated by the triple line arrow, when pumping energy is furnished at a frequency $\nu_0$ equal to ⅓ the frequency separation between states X and P.

This process may be conceived as consisting of successive single photon virtual transitions through the alternative chains, X to $A_1$ to $B_1$ to P, X to $A_1$ to $B_2$ to P, X to $A_2$ to $B_1$ to P, and so forth. Lasing emission is indicated between the pumped state P, which here again is assumed to play the role of the upper state U, and a terminal state L, with the lasing frequency $\nu_L$, corresponding to the energy separation between P and L. By tuning of the optical cavity, the terminal state L may be selected from one of the B-coupling states or from a separate low lying state $L_0$ of the proper symmetry.

As has been indicated previously, there is no necessity for the population inverted upper state U, from which the lasing emission occurs, to be identical to the multiphoton absorption pumped state P. In several classes of embodiments, relaxation processes will drain the excitation population from P to a different, usually somewhat lower lying inversion state U. In crystalline substances, the relaxation may occur through the media of the lattice vibration modes. Here, P and U possibly may correspond respectively to higher and lower portions of the same finite width "energy band." In gaseous substances, relaxation may occur through excitation exchange during "inelastic collision" processes. Also, as is true for the conventional single photon absorption pumped lasers, the two states P and U possibly may belong to two different species of constituent particles in the lasing substance. This is true both for gaseous state and for crystalline state embodiments.

The relaxation transfer of excitation population from a pumped state P to a different inversion state U does not alter the multiple "virtual transition" pumping processes illustrated diagrammatically in FIGS. 1 through 3. The representation of the lasing emission process is altered, however, to the form shown in FIG. 4. The class of systems represented by FIG. 4 differs from the systems of FIGS. 1–3 in that the pumped particles descend from the principal state P to an upper lasing state L through a nonradiative relaxation process. The relaxation process is not subject to the selection rules for radiative electric dipole transitions. When a population inversion occurs between states U and a lower lying state L, which is related to the upper state U by the ordinary selections rules, lasing emission can be induced to occur between the states U and L at a frequency $\nu_L$ corresponding to the energy level separation therebetween.

Owing to the extremely intense spectrally radiation fields required, potential multiple photon absorption pumped lasing substance must possess energy level distributions suitable for use in conjunction with pumping sources of the required intensity. Radiation fields of monochromatic spectral intensity sufficiently large to produce the required multiple photon absorption induced population inversion, in selected lasing substances with favorable distributions of energy levels, can be achieved, for example, by the expedient of utilizing the output of a laser as a pumping source. While an ordinary laser would be suitable as a multiple photon absorption pumping source, it is preferred to use a giant pulse laser for increased pumping efficiency. A giant pulse laser would have the additional advantage of reducing the pumping time to the order of $10^{-8}$ seconds, and of virtually eliminating the heating of the lasing substance when the pumped state P also acts as the upper state U for the lasing emission.

A sufficiently intense optical frequency monochromatic radiation field can be produced by a ruby laser. The wavelength of the ruby laser beam can be shifted from 6945 A. when operated at a temperature of 60° C., to 6934 A. at 77° K. This would provide a corresponding range of pumping frequencies, in wavenumber units, of from 14,399 cm.$^{-1}$ to 14,421.7 cm.$^{-1}$.

Among other currently available sources capable of delivering a sufficiently intense monochromatic pumping field are the gadolinium and neodymium-in-glass lasers. The respective optical frequencies of the pumping fields provided by these two types of lasers would be in the vicinity of 32,000 cm.$^{-1}$ and 9434 cm.$^{-1}$. Again the precise pumping frequency obtained could be shifted somewhat by temperature control.

Thallium activated alkali halide lasers also are promising pumping sources. It appears that this type of a laser would be continuously tunable over either of two broad high frequency emission bands, one centered at 3050 A., or 32,900 cm.$^{-1}$, and the other at 4750 A., or 21,050 cm.$^{-1}$. When multiple photon absorption pumping is supplied by an alkali halide-thallium laser, the resulting range of optical pumping frequencies can be extended to two continuous intervals of several thousand reciprocal centimeters width centered at approximately 32,900 cm.$^{-1}$ and at 21,050 cm.$^{-1}$.

Multiple photon absorption pumping sources, however, are not restricted to those named above, and other suitable sources certainly should become available in the future.

Among suitable lasing substances, the following have favorable distributions of energy levels for multiple photon absorption pumping to be induced when the output beams of one of the above-mentioned single photon absorption pumped lasers is the pumping source. When the pumping source is the output of a ruby laser: (1) cesium vapor is suitable for double photon pumping; (2) napthalene or erbium chloride ($ErCl_2$) crystals, and vapors of antimony (Sb), diatomic carbon ($C_2$), boron oxide (BO), beryllium oxide (BeO), or silicon oxide (SiO) are suitable for triple photon absorption pumping. Fluorescence resulting from double photon absorption pumping and from triple photon absorption pumping already have been demonstrated in cesium and naphthalene, respectively. Bromine chloride gas (BrCl) and the first positive ion of molecular nitrogen ($N_2^+$) can be made to lase by double photon absorption pumping with a sufficiently intense field at the frequency of the output of a gadolinium laser. That is to say, these molecules possess suitable excited states with electronic-vibrational-rotational excitation corresponding to 64,000 cm.$^{-1}$. Chlorine ($Cl_2$) and chlorine fluoride (ClF) gases can be made to lase by double photon absorption pumping with the output beam of a giant pulse neodymium laser. For molecular gases and molecular crystals the coupling levels could be the rotationally-vibrationally excited levels of the ground electronic state or of higher electronic states. Since selection rules tend to weaken and break down in condensed state substances, the ruby laser itself possibly could be driven by double photon absorption of the monochromatic radiation field emitted by a neodymium in glass laser. The pumping time for the ruby laser then would be that set by the approximately $10^{-7}$ second relaxation process from the pumped state P to the upper state U.

Specific examples will now be given of the energy level states which would participate in the double photon absorption pumped lasing process for cesium vapor, Table I, and for triple photon absorption pumped lasing process for naphthalene, Table II, and for erbium chloride, Table III. The coupling state designations and threshold parameters will be spelled out in detail only for cesium.

TABLE I—DOUBLE PHOTON ABSORPTION PUMPED CESIUM VAPOR LASER

Lasing Substance: Atomic cesium, B.P.=670° C.
Pumping Source: giant pulse ruby laser, output radiation $C^{-1}\nu_0$ =14,399 cm.$^1$ to 14,422 cm.$^1$

| | Spectroscopic designation | Excitation interval $C^{-1}\nu$ (cm.$^{-1}$) |
|---|---|---|
| Pumping designations: | | |
| Participating states: | | |
| Initial state X | 5p$^6$ 6s $^2S_{1/2}$ | 0 |
| | Ground state | |
| Pumped state P and Upper state U | 5p$^6$ 9d$^6$ { $^2D_{3/2}$ or $^2D_{5/2}$ } | →28,828.9 →28,836.1 |
| Lowest coupling states: | | |
| A$_1$ | 5p$^6$ 6p $^2P^0_{1/2}$ | 11,178.2 |
| A$_2$ | 5p$^6$ 6p $^2P^0_{3/2}$ | 11,732.4 |
| Other coupling states: | | |
| A$_i$; i=3, 4, 5, . . . | 5p$^6$ np { $^2P^0_{1/2}$ $^2P^0_{3/2}$ } | n=7, 8, 9, . . . |

TABLE I.—Continued

| | Spectroscopic designation | Excitation interval $C^{-1}\nu$ (cm.$^{-1}$) |
|---|---|---|
| Lasing Designations: | | |
| Highest Energy Lasing Transitions | (P=U→(L=A$_1$, or A$_2$) | |
| Lasing Transitions: | Wavenumber frequency and wavelength | |
| $5p^6 9d\ ^2D_{3/2} \to 5p^6 6p\ ^2P^0_{1/2}$ | 17,650.7 cm.$^{-1}$, (5,665.50A.) | |
| $5p^6 9d\ ^2D_{3/2} \to 5p^6 6p^2\ P^0_{3/2}$ | 17,096.5 cm.$^{-1}$, (5,849.15A.) | |
| $5p^6 9d\ ^2D_{5/2} \to 5p^6 6p\ ^2P^0_{3/2}$ | 17,103.7 cm.$^{-1}$, (5,846.69A.) | |
| Estimated threshold characteristics: | | |
| Cavity cross sectional area: 1 cm.$^2$ | | |
| Cavity length: 10 cm. | | |
| One percent transmission for the transmitting mirror. | | |
| Cs vapor pressure of 10$^{-2}$ atmospheres. | | |

| Threshold excited state (9 D$_{3/2}$) population | Threshold pumping power | Cs laser coherent power output 17,650.7 cm. (5,666 A.) |
|---|---|---|
| 10$^9$ cm.$^{-3}$ | 10$^5$ watt cm.$^{-2}$ | 0.1 watt cm.$^{-2}$ |

These are threshold characteristics. The actual power output can be considerably greater depending upon the applied ruby laser power, modifications of the cavity length, mirror transmission factor, and the cesium vapor pressure.

Referring now to FIG. 5, there is shown a schematic diagram of a gas laser apparatus pumped by double photon absorption according to the invention. An elongated envelope 10 of glass or quartz is filled with cesium vapor at the proper pressure. The side walls of the envelope 10 are transparent to the pumping radiation, herein shown as being supplied from a plurality of giant pulse ruby lasers 12, for example. For a more complete description of giant pulse lasers, reference is made to the textbook on lasers, Generation of Light by Stimulated Emission, by Bela A. Lengyel, John Wiley and Sons, Inc., New York, 1962, pp. 59–63.

The envelope 10 containing the cesium vapor is placed in an optical cavity formed by two spaced reflectors 14 and 16, shown preferably as confocal reflectors. The reflectors 14 and 16 are aligned with their reflecting surfaces perpendicular to the longitudinal axis of the envelope 10. One of the reflectors 16 is partially transmitting to permit external emission of light in the form of a coherent beam 18. The ends of the envelope 10 are provided with optically flat windows 20 and 22 oriented at the Brewster angle to minimize unwanted reflections from those ends.

The pumping lasers 12 are oriented to direct the pumping light beams into the envelope 10 perpendicular to the longitudinal axis of the envelope 10.

In the manner previously described herein, the cesium atoms contained within the envelope 10 are excited by double photon absorption of the radiation from the pumping lasers 12 to emit light of a frequency to which the optical cavity formed by the reflectors 14 and 16 is tuned. One of the reflectors 14 is preferably movable along the longitudinal axis of the cavity to change the separation between the reflectors 14 and 16 and thereby tune the cavity to one of several frequencies.

TABLE II—TRIPLE PHOTON ABSORPTION PUMPED NAPHTHALENE CRYSTAL LASER

Lasing Substance: Single crystal of naphthalene
Pumping Source: Giant pulse ruby laser output radiation:
$C^{-1}\nu_\sigma = 14{,}399$ cm.$^{-1}$ to 14,422 cm.$^{-1}$
$3C^{-1}\nu_\sigma = 43{,}197$ cm.$^{-1}$ to 43,266 cm.$^{-1}$

| | Spectroscopic designations | Excitation interval (cm.$^{-1}$) |
|---|---|---|
| Pumping designations: | | |
| Participating states: | | |
| Initial state X | Ground State 1A$_{1g}$ (0,0) | 0 |
| Pumped state P | Suitable P-states are known to exist, but their formal designation somewhat questionable. Probably they are higher vibrational levels of an 1B$_{2\mu}$ excited state. | Strong absorption system. 40,000 to 45,000 cm.$^{-1}$. |
| Upper state U | Probably either P or, by relaxation, lower vibrationally-rotationally excited sublevels of the same 1B$_{2u}$ electronic state. | Less than 43,266 cm.$^{-1}$. |
| Coupling states A$_i$ and B$_i$. | Vibrationally-rotationally excited sublevels of 1A$_{1g}$ ground electronic state, and also vibrationally-rotationally sublevels of 1B$_{2u}$. | |
| | Selectable wavenumber frequencies | |
| Lasing Designations: | | |
| Lasing Transitions: From above U states to relatively low, but not zero, vibrationally-rotationally sublevels of 1A$_{1g}$ ground electronic state. | Many discrete wavenumber frequencies in the interval from 25,000 cm.$^{-1}$ to 31,000 cm.$^{-1}$. | |

TABLE III—TRIPLE PHOTON ABSORPTION PUMPED ERBIUM CHLORIDE CRYSTAL LASER

Lasing Substance: Single crystal of erbium chloride
Pumping Source: Giant Pulse ruby laser output radiation:
$C^{-1}\nu_\sigma = 14{,}399$ cm.$^{-1}$ to 14,422 cm.$^{-1}$
$3C^{-1}\nu_\sigma = 43{,}197$ cm.$^{-1}$ (60° C.) to 43,266 cm.$^{-1}$ (77° K.)

| | Spectroscopic designations | Excitation interval (cm.$^{-1}$) |
|---|---|---|
| Pumping designations: | | |
| Participating states: | | |
| Initial state X | Ground state $^4$I$_{15/2}$ | 0. |
| Pumped state P | 4D'$_{3/2}$* | 43,275. |
| | or | |
| | 2I'$_{13/2}$ | 43,246. |
| Upper state U | Probably one of above P states, but also some possibility of relaxation process occurring. | ≤$C^{-1}\nu$ of selected P state. |
| Coupling states: A$_i$ and B$_i$. | A large number of excited states exist that are eligible to act as coupling states. | <41,000 cm.$^{-1}$. |
| | Selectable wavenumber frequencies | |
| Lasing designation: | | |
| Lasing transitions: From P, or U, as indicated above, to some lower level selected from several available low lying states of relatively small excitation relative to X. | One of several discrete frequencies of $C^{-1}\nu$ less than 41,000 cm.$^{-1}$. | |

*Cooling of ruby laser below approximately 60° K. required.

Reference is now made to FIG. 6 for a description of a solid state laser apparatus pumped by multiple photon absorption according to the invention. The laser oscillator apparatus 30 includes a solid laser body or rod 32 of circular or rectangular cross section. The substance of the rod 32 may comprise any one of the solid materials disclosed herein as being suitable for multiple photon absorption pumping, such as naphthalene or erbium chloride, for example.

The laser rod 32 is mounted within an optical cavity formed by two spaced reflectors 34 and 36. The reflectors 34 and 36 are shown as separate plane parallel elements. However, it is understood that they may comprise spherical reflectors, as disclosed in U.S. Pat. No. 3,055,257 to G. D. Boyd et al., or they may take any other suitable configuration. Also, the reflectors 34 and 36 may be incorporated as integral parts of the laser rod 32, such as optically reflective coatings covering the end surfaces 38 and 40 of the rod 32. In any case, the reflectors 34 and 36 form an optical cavity whose longitudinal axis coincides with that of the rod 32. Preferably, one of the reflectors 36 is partially light transmissive to provide a useable light output. The end surfaces 38 and 40 of the rod 32 are polished and optically flat within a few wavelengths of the emitted light, according to well known laser technology.

The pumping energy for pumping the laser rod 32 by means of multiple photon absorption is supplied by one or more ruby lasers 42, one of which is shown. The pumping laser 42, which may be a giant pulse laser, is oriented to direct the pumping light beam into the laser rod 32 perpendicular to the longitudinal axis of the rod 32.

A light reflecting enclosure 44 surrounds the laser rod 32, the reflectors 34 and 36, and the laser 42 to comprise the radiation emitted by the laser 42 where it will most efficiently irradiate the laser rod 32 The enclosure may be provided with an opening or window 46 for transmitting the output radiation.

As described above, the spectrally active particles contained in the laser rod 32 are excited by multiple photon absorption of the radiation from the pumping laser 42 to emit light of a frequency to which the optical cavity is tuned.

In single photon obsorption processes at a spectral frequency $\nu_0$, the rate $r_1$ of pumped transitions is proportional to the monochromatic spectral density $\rho''_\sigma$ of the pumping field. Analysis shows that for multiple photon absorption pumping, the rate $r/n$ of pumped transitions is proportional to $$\rho_{\nu_0}^n$$

Therefore, for sufficiently intense monochromatic spectral density of the pumping field, a multiple photon absorption pumping process can become more efficient than normal single photon absorption pumping.

What is claimed is:
1. Laser apparatus comprising:
    a body of material including atoms capable of stimulated emission of radiation by triple absorption of photon energy having a pumping frequency which is the corresponding submultiple of the frequency separation between initial and pumped quantum states of said atoms;
    said atoms having at least one group of coupling quantum states of different energy levels which are arranged with said initial and pumped states in an ordered array of quantum states;
    each quantum state in said array having permitted single photon radiative electric dipole transistions with its nearest adjacent quantum state in said array;
    the number of said coupling states in said array being one less than the multiplicity of photons absorbed by an individual atom undergoing a transition from said initial to said pumped state;
    an optical cavity in which said body is disposed;
    means coupled to said cavity for permitting light to escape therefrom;
    and means for pumping said atoms with radiation of said pumping frequency having sufficient intensity to cause population inversion between an upper and a lower quantum state of said atoms,
    thereby to cause said body to emit radiation of a frequency corresponding to the separation between energy levels of said upper and lower quantum states.

2. Laser apparatus according to claim 1, wherein the coupling states of said at least one group have different energy levels lying between those of said initial and pumped states.

3. Laser apparatus according to claim 2, wherein said coupling states are arranged with said initial and pumped states in an ordered array of quantum states of increasing energy levels.

4. Laser apparatus according to claim 1, wherein said initial and pumped quantum states and said upper and lower quantum states belong to the same species of spectrally active particles.

5. Laser apparatus according to claim 4, wherein said pumped state and said upper state are one and the same quantum state.

6. Laser apparatus according to claim 4, wherein said lower state is one of said coupling quantum states.

7. Laser apparatus according to claim 1, wherein said lower state is a quantum state other than one of said coupling states lying at an energy level between said pumped state and said initial state and closer in energy level to said initial state than to said pumped state.

8. A laser for generating optically coherent monochromatic radiation comprising:
    (a) a single crystal consisting substantially of naphthalene molecules capable of stimulated emission of radiation by triple photon absorption of monochromatic radiation having a pumping frequency that is one-third the frequency separation between an initial and a pumped quantum energy state of said naphthalene crystal;
    (b) an optical cavity in which said crystal is disposed;
    (c) means coupled to said cavity for permitting light to escape therefrom; and
    (d) means for pumping said crystal with monochromatic radiation of said pumping frequency, said radiation having sufficient intensity to cause population inversion between said pumped state and a lower state, thereby to cause said crystal to radiate at a frequency corresponding to the separation between energy levels of said pumping state and said lower state.

9. A laser for generating optically coherent monochromatic radiation comprising:
    (a) a single crystal consisting substantially of erbium chloride molecules capable of stimulated emission of radiation by triple photon absorption of monochromatic radiation having a pumping frequency that is one-third the frequency separation between an initial and a pumped quantum energy state of said erbium chloride crystal;
    (b) an optical cavity in which said crystal is disposed;
    (c) means coupled to said cavity for permitting light to escape therefrom; and
    (d) means for pumping said crystal with monochromatic radiation of said pumping frequency, said radiation having sufficient intensity to cause population inversion between said pumped state and a lower state, thereby to cause said crystal to radiate at a frequency corresponding to the separation between energy levels of said pumping state and said lower state.

References Cited

Peticolas et al., Double Photon Excitation in Organic Crystals, Phys. Rev. Lttr. vol. 10, No. 2, Jan. 15, 1963, pp. 43–45.

Singh et al., J. Chem. Phys. vol. 38, p. 2032–3, April 1963.

Abella, Opt. Double-Photon Absorption in Cesium Vapor, Phys. Rev. Lttrs. vol. 9, #11, Dec. 1, 1962, pp. 453–5.

Singh et al.: "Three Photon Absorption Naphthalene by Laser Excitation," Physical Review Letters, vol. 12, pp. 612–14, June 1, 1964.

JEWELL H. PEDERSEN, Primary Examiner

E. BAUER, Assistant Examiner